(12) United States Patent
Crosta et al.

(10) Patent No.: US 12,674,656 B2
(45) Date of Patent: Jul. 7, 2026

(54) SYSTEM FOR CHECKING THE ATTITUDE ANGLES OF THE WHEELS OF A LAND VEHICLE, IN PARTICULAR FOR A CONTACTLESS CHECK, AND ASSOCIATED METHOD OF CHECKING

(71) Applicant: VAMAG S.r.l., Cassano Magnago (IT)

(72) Inventors: Giovanni Crosta, Cassano Magnago (IT); Alessandro Ratti, Cassano Magnago (IT)

(73) Assignee: VAMAG S.r.l., Cassano Magnago (IT)

( * ) Notice: Subject to any disclaimer, the term of this patent is extended or adjusted under 35 U.S.C. 154(b) by 802 days.

(21) Appl. No.: 18/114,546

(22) Filed: Feb. 27, 2023

(65) Prior Publication Data

US 2023/0273008 A1 Aug. 31, 2023

(30) Foreign Application Priority Data

Feb. 28, 2022 (IT) ........................ 102022000003701
May 24, 2022 (IT) ........................ 102022000010712

(51) Int. Cl.
| | |
|---|---|
| *G01B 7/315* | (2006.01) |
| *G01B 21/20* | (2006.01) |
| *G01B 21/26* | (2006.01) |
| *G01S 7/481* | (2006.01) |

(52) U.S. Cl.
CPC ............. *G01B 7/315* (2013.01); *G01B 21/20* (2013.01); *G01B 21/26* (2013.01); *G01S 7/481* (2013.01)

(58) Field of Classification Search
None
See application file for complete search history.

(56) References Cited

U.S. PATENT DOCUMENTS

| | | | | |
|---|---|---|---|---|
| 9,779,560 B1 * | 10/2017 | Dorrance | ............. | G01B 11/026 |
| 9,779,561 B1 * | 10/2017 | Dorrance | ............. | G01B 11/026 |
| 10,222,455 B1 * | 3/2019 | Stieff | ................. | G01M 17/007 |

FOREIGN PATENT DOCUMENTS

| | | | | |
|---|---|---|---|---|
| WO | WO-0071972 A1 * | 11/2000 | ........... | G01B 11/275 |

* cited by examiner

*Primary Examiner* — Eric L Bolda
(74) *Attorney, Agent, or Firm* — Bay State IP, LLC

(57) ABSTRACT

A system for checking the attitude angles of wheels is provided, in a manner that is known per se, with a vertical measuring or column 1 on which some transmitters and receivers of electromagnetic signals are installed—for example coherent light illuminators (typically lasers) and associated reflected light sensor—which overall define a group of distance sensors.

According to the disclosure, the proposed system is produced using distance sensors appropriately fitted on a single vertical measuring structure which is positioned, on a side of a movement path, where the vehicle equipped with wheels moves, that has a substantially transverse direction with respect to the acquisition direction of the distance sensors.

5 Claims, 3 Drawing Sheets

1

SYSTEM FOR CHECKING THE ATTITUDE ANGLES OF THE WHEELS OF A LAND VEHICLE, IN PARTICULAR FOR A CONTACTLESS CHECK, AND ASSOCIATED METHOD OF CHECKING

CROSS REFERENCE TO RELATED APPLICATION

This application takes priority from and claims the benefit of Italian Patent Application No. 102022000003701 filed on Feb. 28, 2022 and Italian Patent Application No. 102022000010712 filed on May 24, 2022, the contents of which are herein incorporated by reference.

FIELD OF THE INVENTION

The present invention relates to a system for checking the attitude angles of the wheels of a land vehicle. In particular, a contactless checking system is concerned.

BACKGROUND ART

It is known that the life of tyres of a land vehicle and also vehicle driving safety depend fundamentally on the relative orientation between the plane of rotation of the wheels and the road, as well as the reference plane of the vehicle itself.

It is also known that the wheels are fitted on a motor vehicle with a suspension and steering system (for the front wheels or even the rear wheels in vehicles with four-wheel steering) which arrange their plane of rotation at certain attitude angles both with respect to the road (referred to as "camber angle"), and with respect to the plane of longitudinal symmetry of the vehicle (called "toe angle").

Compliance with the parameters indicated by the manufacturer when fitting wheels ensures the life of the tyres and vehicle driving stability; therefore these angles must be checked periodically.

There are many techniques for measuring and checking these angles. Traditional methods require installing on the wheels special devices and/or targets which are then detected by instrumentation fixed to the ground to determine and measure the angles of interest with a high level of precision. This solution is expensive and time consuming.

To overcome the drawbacks of these systems, checking systems having no contact with the wheels have already been proposed for some time, i.e. optoelectronic measurement instruments which do not require engaging complex structures on the wheels.

Some of these measurement devices are described in U.S. Pat. No. 4,899,218 and DE-A-2948573.

WO00/71972 discloses a particularly advantageous arrangement, wherein a laser beam is made to traverse over a main detection plane and over at least one additional plane, these planes passing through the plane of the wheel; in the method proposed, the beam reflected from the surface of the wheel is detected, and this defines a signal representative of the spatial position of measurement points on the wheel in the spatial reference system.

By exploiting the same principle to determine a relative movement between the illuminating laser beam and the reference surface of the wheel, solutions have been proposed wherein the laser beams are static in a checking station and the wheel is made to advance in front of the illuminator, moving the entire vehicle. Examples of this type are already known from EP 895.056, but subsequently described in many other documents.

Some of these systems, while not capable of producing a very accurate measurement of the angles, are well-suited to preliminary analyses, as "pre-check" instruments, in order to at least establish whether the characteristic angles are approximately outside the specified thresholds and require, if necessary, a successive accurate measurement at an appropriate station.

A pre-check device should be fast and non-intrusive in the vehicle receiving process at a service station, so as to have the least impact possible on the waiting time of the customer. These instruments are typically installed at a position where vehicles must pass through when entering the service station, without having to stop, so as to immediately provide the result of the check "on the fly" in the form of an approval or disapproval, without a specific accurate measurement.

The commercially proposed solutions are capable of providing this indication, but require that the vehicle is moved between two opposite measurement systems (typically small columns equipped with appropriate sensors) on both sides of the vehicle, capable of determining the orientation of the wheels and the direction of movement of the vehicle, and extracting an approximate measurement of the characteristic angles of the wheels. In particular, the measurement of the distance of certain characteristic points on the wheels of the vehicle is used, acquired when the wheels are rolling, with respect to a reference element external to the vehicle; by combining these measurements on both lateral sides of the vehicle, the wheel and vehicle positions and the associated angles are determined.

Current solutions necessarily use two opposite acquisition units on both lateral sides of the vehicle to be able to determine, in addition to the angles of the wheels, even their unique reference system.

Example systems from the prior art, always equipped with a pair of acquisition units on both sides of the vehicle, are described in U.S. Pat. Nos. 9,779,560, 9,779,561 and 10,222,455.

Clearly, installing two acquisition units implies a size and a cost which is a drawback of these solutions.

SUMMARY OF THE INVENTION

The aim of the present invention is to solve the above-mentioned problems. In particular, it is desired to provide a contactless pre-check system which can supply useful results, even by detecting the points on the wheels from only one side of the vehicle.

This aim is achieved with a checking system as described, in its essential terms, in the accompanying main claim. Other preferred characteristics of the invention are defined in the dependent claims.

BRIEF DESCRIPTION OF THE DRAWINGS

Other features and advantages of the invention will become clearer from the following detailed description of preferred embodiments thereof, given by way of example and in a non-limiting manner, and illustrated in the accompanying drawings in which.

DETAILED DESCRIPTION OF PREFERRED EMBODIMENTS

A system for checking the attitude angles of wheels is provided, in a manner that is known per se, with a vertical measuring or column 1 on which some transmitters and receivers of electromagnetic signals are installed—for example coherent light illuminators (typically lasers) and associated reflected light sensors—which overall define a group of distance sensors.

According to the invention, the proposed system is produced using distance sensors appropriately fitted on a single vertical measuring structure which is positioned, on a side of a movement path, where the vehicle equipped with wheels moves, that has a substantially transverse direction with respect to the acquisition direction of the distance sensors.

For example, a longitudinal vehicle movement path is provided and the receiving sensors are arranged with a reception axis (or detection line) perpendicular to the movement path.

Figures 1, 2:
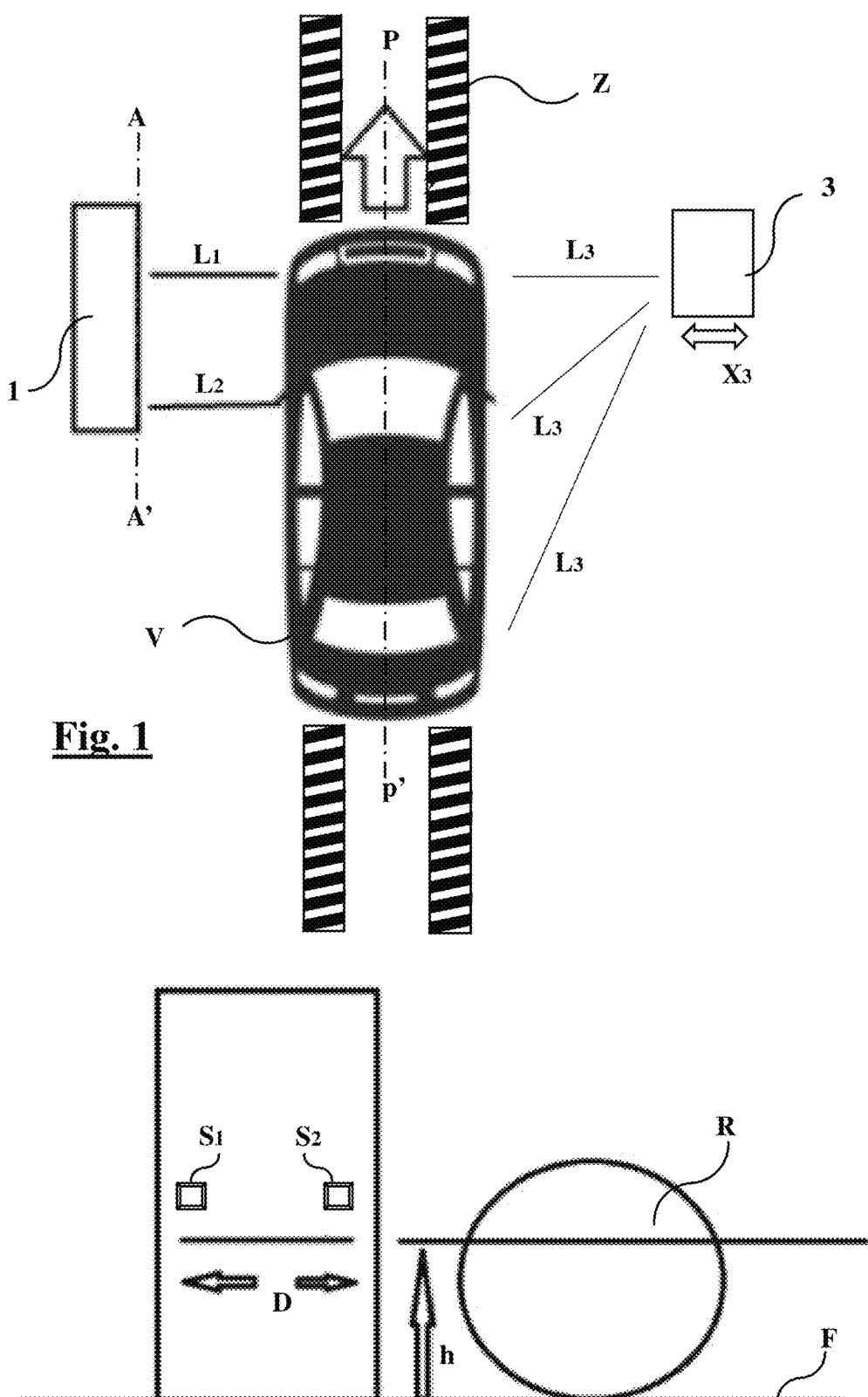
FIG. 1 is a schematic top plan view which illustrates a vehicle placed beside a system according to the invention.
FIG. 2 is a schematic side elevation view of a vehicle wheel close to the system according to the invention.

As represented in FIG. 1, the detection lines or directrices $L_1$ and $L_2$ of the distance sensors $S_n$ are positioned on the vertical measuring structure 1 so as to be arranged substantially orthogonally with respect to the through-lane P-P' for the vehicle. The single vertical structure 1 is arranged therefore on only one of the two lateral sides of a vehicle V which passes through the through-lane P-P'.

In particular, the system includes at least two distance detection units $S_1$, $S_2$ . . . Sn capable of measuring the distance between a common reference plane, for example the plane A-A' parallel to the through-lane P-P', and a reference point on the lateral surface of a vehicle V, distance measured along the directrices $L_1$ and $L_2$.

The directrices $L_1$ and $L_2$ are arranged in parallel with each other with high precision, for example less than a very small tolerance angle of around 5".

The vehicle V moves in the direction of the through-lane P-P' and therefore approximately orthogonally with respect to the directrices $L_1$ and $L_2$.

The distance detection units $S_1$, $S_2$ . . . Sn can be distance reading devices based on many different technologies (for example reflection sensors), but suitable for measuring the distance between the reference plane A-A' and a point of intersection between the respective directrix of the sensor, $L_1$ and $L_2$, and the external lateral surface of the vehicle V (without contact with the same vehicle) which is moving, in particular the surfaces of the front and rear wheels.

In the embodiment illustrated in FIG. 2, two distance detection units $S_1$, $S_2$ are positioned at a respective height h from the running surface F of the wheels R on which the vehicle V moves, approximately equal to an average height at which a hub of the wheels R is located. To this end, the system can provide several pairs of distance detection units arranged at different heights, so as to advantageously cover different wheel measurements which have different heights from the running surface. For the case when the system detects that there are several reliable measurements of the various pairs of sensors (even placed at different heights), the various measurements can be combined to improve the overall quality of the check. The measurements are considered to be reliable when the characteristic angles (which will be better indicated later) which result from the corresponding calculation are consistent with respect to the existing geometric relationships between the angles. Furthermore, since the surface of the vehicle is detected twice—i.e. along the two directrices $L_1$ and $L_2$ spaced out from one another as shall be seen later—the measurement is considered to be reliable if the profile which results from each of them is exactly the same, except for a possible shift due to the fact that the vehicle may not be moving exactly parallel to a reference plane A-A'.

The two distance detection units $S_1$, $S_2$, in particular the associated measurement directrices $L_1$ and $L_2$, are positioned horizontally with a certain distance D between them, this distance being at least greater than the radius of the smallest wheels expected to pass through the checking system. An optimal distance D is approximately equal to the diameter of the reference wheel to be detected. The minimum value of this distance depends on the measurement precision desired with respect to the precision available from the detection units $S_1$ and $S_2$ for the measurement of the distance $L_1$ and $L_2$: a linear measurement error s on the distances $L_1$ and $L_2$ produces a measurement error on the angles of interest of $\varepsilon/D$, which must be less than the measurement tolerance required, in general 15 arc minutes.

Although not to be considered limiting, it is preferable that the distance detection units are laser triangulation units.

Figure 3:
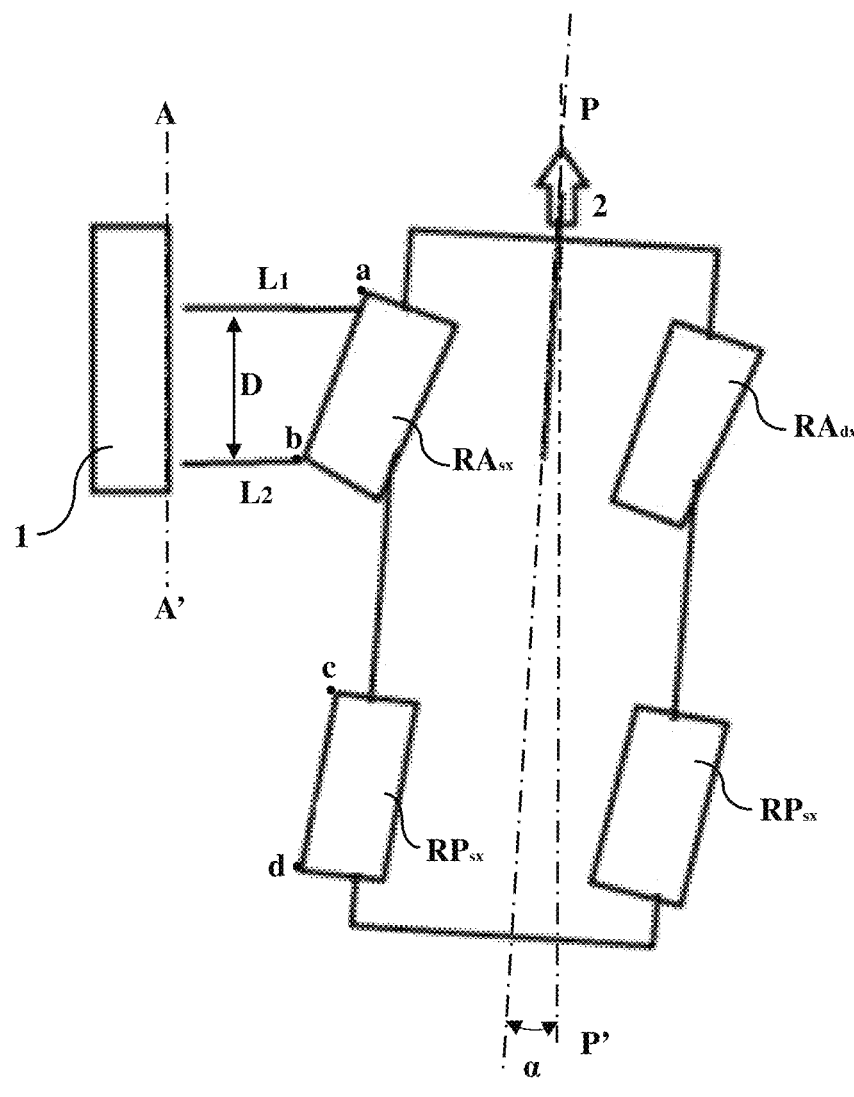
FIG. 3 is a similar view to that of FIG. 1, schematically depicting the attitude angles of the wheels.
Figure 4:
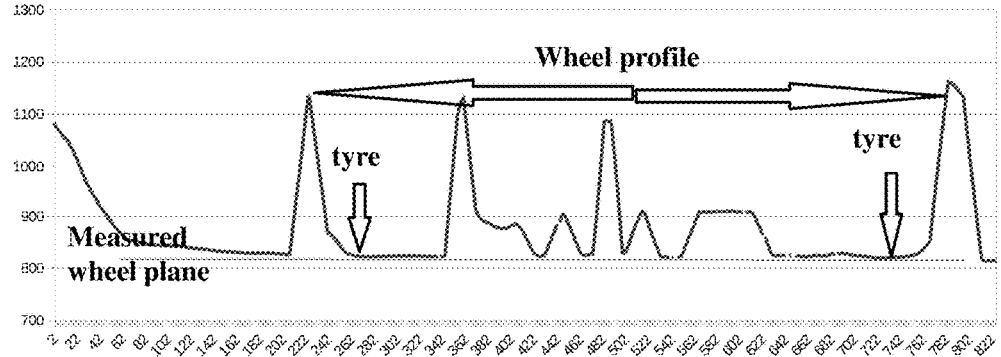
FIG. 4 is a plot representing measurement points detected by distance sensors.

Operationally, the vehicle V is made to advance along the through-lane P-P' (in the direction of the arrow drawn in FIG. 1) and the two distance detection units $S_1$, $S_2$ measure the distance between the reference plane A-A' and the lateral surface of the vehicle. In particular, the sensors of the units acquire the distance measurement of at least a series of points on the wheels R, which is useful for determining their position on a horizontal plane (FIG. 3) and therefore the orientation on the horizontal plane of the polyline intersecting the points. In particular, a sequence of distance measurements is carried out on the directrices $L_1$ and $L_2$, which are acquired while the car V passes in front of the sensor (see the plot of FIG. 4); the edges of the wheel are identified by a sudden variation in distance (see the two peaks of the plot in FIG. 4) which appear when there is a transition from the body of the vehicle to the wheel as the wheel housing passes through.

Figure 5:
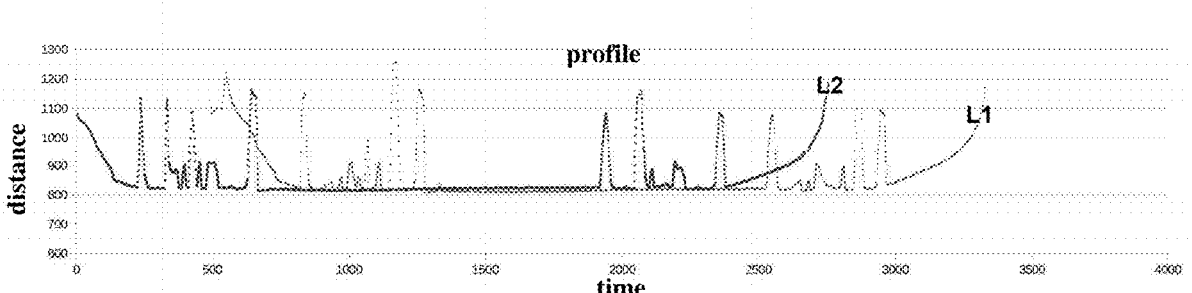
FIG. 5 is a plot representing the superimposing of measurements according to two directrices in the arrangement according to the invention.

Once the wheel position points are detected with the two sensors (see also the plot of FIG. 5 which represents the superimposition of the two detections displaced in time), the outermost point of the tyre is determined as reference in order to calculate the distance measurements at points a, b, c, d (FIG. 3) and therefore the wheel position planes and the desired angles.

A wheel start point and a wheel end point are assumed to be acquired along the horizontal axis of height h, either on a front wheel, for example the left wheel RAsx, or on a rear wheel, hence the wheel RPsx. In that case, the distances of the points identified in FIG. 3 as a, b, c, d, will be acquired, and acquired by both the distance detection units $S_1$, $S_2$, which distances are therefore identified as a(1), b(1), c(1), d(1), a(2), b(2), c(2), d(2).

Based on these eight measurements, it is possible to determine:

a first direction of advancement of the vehicle measured on the front wheel when a same point thereof passes by the two different detection units, for example $\alpha = (a(\mathbf{2}) - a(\mathbf{1}))/D$;

a direction on the horizontal plane of the front wheel accessible to the measurement system (in FIG. 3, the left front wheel), i.e. $\beta = (a(\mathbf{1}) - b(\mathbf{1}))/Ha$, where Ha is the horizontal distance between the two points a and b on the front wheel (Ha being the distance between two "homologous" points on the wheel, which depends on the measured chord of the wheel; in the optimal case D=Ha, but in practice Ha can be different; to identify it, it is useful to detect the vehicle speed such that, by measuring the time between the determination of the characteristic points, Ha is obtained);

the apparent toe angle of the front wheel accessible to the measurement system, calculated as $\beta-\alpha$;

a second direction of advancement of the vehicle measured on the rear wheel when a same point thereof passes by the two different detection units, for example $\alpha 1=(c(2)-c(1))/D$;

a direction on the horizontal plane of the rear wheel accessible to the measurement system (in FIG. 3, the left rear wheel), i.e. $\gamma=(c(1)-d(1))/Hp$, where Hp is the horizontal distance between the two points c and d on the rear wheel;

the apparent toe angle of the rear wheel accessible to the measurement system, calculated as $\gamma-\alpha 1$;

a quality limit of the measurement obtained (direct consequence of the fact that the car V is proceeding as far as possible in the straight line and is not turning) can be identified by placing a limit on the difference between the calculated angles $\alpha 1-\alpha$.

Under conditions of normal advancement, the actual direction of advancement of the vehicle V is determined by the thrust of the driving wheels and therefore by their toe angles. Under design condition, the rear wheels have identical and symmetrical toe angles with respect to the axis of symmetry (geometric axis) of the vehicle: the vehicle proceeds, advancing according to its axis of symmetry/thrust even when the front wheels have symmetrical toe angles with respect to the axis of symmetry of the vehicle.

For determinations following acquisition of the above-mentioned data, it is preferable that, close to the column 1 which supports the detection units $S_1$, $S_2$, the ideal direction of advancement is drawn on the ground, i.e. the direction along the plane P-P' parallel to the reference plane A-A'. Advantageously, a plurality of parallel stripes Z can be marked out on the running plane F, which stripes can be distinguished visually from one another, for example stripes of alternate colours, so as to aid the vehicle driver to follow the desired direction by acting on the vehicle steering wheel.

Since it is possible for the sensitivity of the distance detection units to be such as to produce the best results only within certain distance ranges, it is appropriate for the car to pass through the measurement area at an appropriate distance from the vertical measuring structure 1 supporting the detection units. Therefore, in addition to the ground-based horizontal signage Z, a second vertical detecting column 3 can be provided, with the purpose of identifying and providing guidance for the area through which the car shall pass. Auxiliary distance sensors can be provided on the vertical detecting column 3, which detect a running distance of the car V according to the directrices $L_3$, so as to be able to determine a possible excessive deviation of the car from the measuring structure 1 and to emit audible and/or visual signals on a signage device $X_3$ which provides appropriate indications to the driver for guiding the vehicle to pass through at the appropriate distance between the structure 1 and the column 3 along the through-lane P-P'.

The vertical detecting column 3 is optionally installed on the side opposite the vertical support structure 1 with respect to the vehicle through-lane P-P'. The signage device $X_3$ is fitted on the same detecting column 3 or can be arranged in a raised position, for example in the form of a traffic signal suspended from above.

The vertical detecting column 3 doesn't need to be connected or made to communicate with vertical measuring column 1.

Hereafter, certain conditions of the vehicle will be analysed, with considerations of appropriate operation of the system according to the invention.

Car with Correctly Set Angles

Under conditions in which the angles are correctly set, it is expected that, with the steering member centred (i.e. with the steered wheels positioned symmetrically with respect to the vehicle axis), the two toe angles of the front wheels are identical between right and left, and that the rear toe angles are symmetrical between right and left.

In that case, even though the system of the invention does not allow the measurement of both the toe angles on the right and left sides of the vehicle, in a correctly aligned vehicle the angles $\beta$ and $\gamma$ (front and rear toe angles) coincide with the values provided on the technical design specifications of the vehicle V: the measurement of only one of the two angles within the rated tolerance value ensures that the condition of correct registration is met.

The vehicle, even if it is correctly set, could move with a non-zero angle with respect to the through-lane P-P' (orthogonal to the measurement directrices $L_1$ and $L_2$ of the distance detection units $S_1$ and $S_2$); nevertheless, in that case, the measurements of the angles $\alpha$ and $\alpha 1$ provide for deriving the direction of advancement of the vehicle and therefore compensating for the toe angle values obtained by the distance measurements on the wheels.

Car with Asymmetrical Front Toe Angle

Under these conditions, to achieve having the vehicle V proceed in a straight line, it is necessary to turn the steering member by a few degrees, otherwise the vehicle would steer in the direction defined by the difference between the toe angles between the two front wheels. Therefore, two effects in the check arise: (i) the first one immediately perceptible by the driver who, to maintain the vehicle in a straight line, is forced to partially turn the steering wheel, and (ii) the second one determined by the calculation of the toe angle of the front wheel which is surely outside the tolerance specified by the manufacturer; this latter effect is particularly obvious because the compensatory use of the steering wheel produces a rotation of the front wheel which is algebraically summed to the natural toe angle of the wheel, and therefore the measured toe angle is affected by the compensation carried out to maintain the straight-line trajectory of the vehicle.

As an alternative, the check could also be made by forcing the steering wheel to be straight: a non-zero angle of advancement $\alpha$ would be obtained which, with the steering wheel straight, clearly would be indicative of at least one incorrectly set toe angle.

Car with Asymmetrical Rear Toe Angle

For the case in which the regulation error of the rear toe angle is on the wheel by the side where the column 1 is provided, i.e. by the side where the measurement is carried out, the check certainly provides a clear detection of a toe angle outside the tolerance admitted by the manufacturer.

If the regulation error is instead on the rear wheel on the opposite side to that where the distance detection is carried out, by virtue of the incorrect toe angle the direction of the thrust axis is in any case changed, which is compensated for by a counter action (=correction) on the steering member; indeed the difference of toe angle urges the vehicle to move along the axis which corresponds to the sum of the toe angles, this being the direction of least effort for the advancement. This steering correction inevitably involves a variation of the angle measured on the front wheels and therefore the computation supplies an alignment error for the vehicle.

Car with Asymmetrical Front and Rear Toe Angles

The combination of the conditions set out above makes the toe angle setting condition detectable in a similar way even if present on the side opposite that where the distance detection takes place. However, it is possible for the toe angle error on the axes of the front wheels and on the axes of the rear wheels to be such that they compensate for each other, and therefore the vehicle proceeds in a straight line without steering corrections. In that case, if the toe angle setting error is on the wheels by the unmeasured side of the vehicle, this error remains unable to be determined since it cannot be detected and measured with the distance detection units according to the invention. The probability that this happens is however very low, since this condition arises when the errors on the toe angles are present only on the wheels by the undetected side and the errors are exactly the same for both the wheels so that they are perfectly compensated each other.

In any case, it is possible to completely eliminate this probability of a lack of check simply by making the vehicle move in the opposite direction (during an additional step), so as to also detect the opposite side; this procedure, which is generally inconvenient, can be invoked only when the vehicle passes the check without any unfavourable outcome, as a counter check before excluding the presence of possible toe angle errors to be measured with accuracy.

Since the orientation of the steering wheel can provide indications of possible vehicle alignment problems, it is preferable for the distance detections carried out with the system according to the invention to be performed in two ways:

(1) keeping the steering member (steering wheel) straight (for example with the addition of a spirit level coupled to the steering member) and letting the vehicle move along the direction determined naturally by the thrust axis and by the front toe angle axis; in this case, the difference between the angles $\alpha - \alpha 1$ provides a useful parameter to determine whether the vehicle travels correctly in the determined direction or whether it is slowly swerving;

(2) keeping the steering member in the direction required to proceed along the desired straight-line through-lane P-P': in this case, it is expected that the difference between the angles $\alpha - \alpha 1$ is zero and the previous considerations let understand whether or not the vehicle is correctly set.

According to a further embodiment, as already mentioned, up to N additional distance detection units Sn are provided for. In that case, the system according to the invention provides for more pairs (N−1) of sensors and there is a set of measurements (a(N−1), b(N−1), c(N−1), d(N−1), a(N), b(N), c(N), d(N)) for each of these pairs of detection units or sensors. Among these, a CPU can select the distance measurements with higher resolution, i.e. the measurement in which the denominator value, in the calculation of β and γ, is numerically higher; other conditions being the same, this is the parameter for choosing the best measurement. For the case in which the denominator values are similar, it is possible to combine several measurements to reduce the measurement error.

As it can be well understood, the checking system thus configured fully satisfies the aims set out in the preliminary sections of this specification.

In particular, the system provides a single vertical structure equipped with measuring components (sensors), thereby producing a major saving in costs and significantly reducing the size impact in a service station. Although the system acquires distance measurements of the tyre profile on only one side of the vehicle, as seen above, by means of an appropriate combination of calculations with the distance measurements, it is however possible to obtain an indication of possible anomalous toe angle settings even if they are present on the undetected side.

It is understood that the invention is not limited to the particular configuration illustrated, which forms a non-limiting example of the scope of the invention, but that numerous variants are possible, all within the capabilities of a technician skilled in the art, without thereby departing from the scope of the same invention.

For example, although not explicitly described, it is intended that the acquisition of the steering angle can be obtained not only with approximating visual methods, for example using a spirit level, but using specific automatic means for detecting the angle of rotation of the steering axis.

Furthermore, it is noted that in the description, reference is always made to a distance detection unit, but it is understood that it can also be replaced in an equivalent manner by a displacement detection unit, i.e. suitable for detecting a relative displacement of a point on the wheel of the vehicle at different instants in time.

Lastly, in addition to the distance detection units appropriately arranged on the vertical structure, it is possible to provide additional detection units, arranged either on the same vertical structure or at other positions, in order to be able to detect additional parameters, for example the camber angle of the wheels of the vehicle.

The invention claimed is:

1. A checking system for the contactless checking of the attitude angles of the wheels of a land vehicle (V), comprising at least one device for detecting the toe angle of the wheels of a vehicle (V) equipped with a pair of distance detection units ($S_1$, $S_2$, . . . Sn) each capable of measuring a wheel distance between a common reference plane (A-A') parallel to a through-lane (P-P') and a reference point on a lateral surface of a vehicle (V) including a wheel moving with respect to said at least one pair of distance detection units ($S_1$, $S_2$, . . . Sn), characterised in that the system includes a single toe angle detection device incorporated on a single vertical measuring structure (1), which is arranged on only one side of said through-lane (P-P'), on which said at least one pair of distance detection units ($S_1$, $S_2$, . . . Sn) is installed at a height (h) from a running plane (F) of said wheels of the land vehicle (V) and at a mutual separation (D) along a horizontal plane, said wheel distance being detected on a front wheel and a rear wheel of the vehicle (V) along directrix lines ($L_1$ and $L_2$) orthogonal to said through-lane (P-P') and wherein said at least one pair of distance detection units ($S_1$, $S_2$, . . . Sn) is configured so as to detect said wheel distance of at least two points ((a(N−1), b(N−1), c(N−1), d(N−1), a(N), b(N), c(N), d(N)) for each of said front and rear wheels and to determine at least the following parameters:

a first direction of advancement of the vehicle (V) on a front wheel as $\alpha = (a(N) - a(N-1))/D$;

a direction on a horizontal plane of a front wheel as $\beta=(a(N-1)-b(N-1))/Ha$;

an apparent front wheel toe angle as $\beta-\alpha$;

a second direction of advancement of the vehicle (V) on a rear wheel as $\alpha1=(c(N)-c(N-1))/D$;

a direction on a horizontal plane of a rear wheel as $\gamma=(c(N-1)-d(N-1))/Hp$;

an apparent rear wheel toe angle as $\gamma-\alpha1$;

where D is said mutual separation, Ha is a horizontal distance between two points (a, b) on the front wheel and Hp is a horizontal distance between two points (c, d) on the rear wheel, at least said parameters being combined to supply a check index.

2. The checking system according to claim 1, wherein a detector of the orientation of a steering member of said vehicle (V) is furthermore provided, which determines a steering angle combined with said parameters to supply a check index.

3. A method for the contactless checking of the attitude angles of the wheels of a land vehicle (V), comprising supplying a system according to claim 1 and performing the following steps:

by means of a pair of distance detection units ($S_1$, $S_2$, . . . Sn), detecting a wheel distance of at least two points (($a(N-1)$, $b(N-1)$, $c(N-1)$, $d(N-1)$, $a(N)$, $b(N)$, $c(N)$, $d(N)$)) for each of a front wheel and a rear wheel with respect to a reference plane (A-A') parallel to a through-lane (P-P');

determining at least the following parameters:

a first direction of advancement of the vehicle (V) on a front wheel as $\alpha=(a(N)-a(N-1))/D$;

a direction on a horizontal plane of a front wheel as $\beta=(a(N-1)-b(N-1))/Ha$;

an apparent front wheel toe angle as $\beta-\alpha$;

a second direction of advancement of the vehicle (V) on a rear wheel as $\alpha1=(c(N)-c(N-1))/D$;

a direction on a horizontal plane of a rear wheel as $\gamma=(c(N-1)-d(N-1))/Hp$;

an apparent rear wheel toe angle as $\gamma-\alpha1$;

where D is said mutual separation, Ha is a horizontal distance between two points (a, b) on the front wheel and Hp is a horizontal distance between two points (c, d) on the rear wheel;

combining said parameters to supply a check index of said vehicle (V).

4. The system according to either claim 1, further comprising visual and/or acoustic indications suitable for supplying information on a deviation from a correct distance measurement of the vehicle (V) by said single vertical support structure (1).

5. The system according to claim 4, wherein said visual and/or acoustic indications are in the form of a signage device ($X_3$) driven based on the detection of a running distance ($L_3$) of the vehicle by auxiliary distance sensors arranged on a second vertical column (3) installed on one side opposite said vertical measuring structure (1) with respect to said through-lane (P-P').

* * * * *